(12) United States Patent
Ammann

(10) Patent No.: US 7,996,999 B2
(45) Date of Patent: Aug. 16, 2011

(54) INCLINATION DETECTOR DEVICE WITH A CLOSED OPTICAL PATH

(75) Inventor: Manfred Ammann, Lauterach (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 12/536,436

(22) Filed: Aug. 5, 2009

(65) Prior Publication Data

US 2010/0031522 A1 Feb. 11, 2010

(30) Foreign Application Priority Data

Aug. 6, 2008 (DE) .......................... 10 2008 041 032

(51) Int. Cl.
*G01C 9/06* (2006.01)
*G01C 9/24* (2006.01)

(52) U.S. Cl. ................ 33/366.16; 33/366.23; 200/61.52
(58) Field of Classification Search ................ 33/366.16, 33/366.11, 366.15, 366.23; 200/61.52
See application file for complete search history.

(56) References Cited

U.S. PATENT DOCUMENTS

| | | | | |
|---|---|---|---|---|
| 3,863,067 A * | 1/1975 | Gooley | ...................... | 33/366.16 |
| 4,536,649 A * | 8/1985 | Kozai et al. | .............. | 250/231.14 |
| 4,869,590 A * | 9/1989 | Feist et al. | .................... | 356/148 |
| 5,101,570 A * | 4/1992 | Shimura | ..................... | 33/366.16 |
| 5,317,810 A * | 6/1994 | Isono et al. | ................ | 33/366.16 |
| 5,953,116 A * | 9/1999 | Ohtomo et al. | ............... | 356/249 |
| 6,248,989 B1 * | 6/2001 | Ohishi | .......................... | 250/205 |
| 6,343,422 B1 * | 2/2002 | Takahashi | ................. | 33/366.16 |
| 6,647,634 B2 * | 11/2003 | Yang et al. | ....................... | 33/390 |
| 7,497,021 B2 * | 3/2009 | Perchak et al. | ............. | 33/366.16 |
| 7,526,870 B2 * | 5/2009 | Klapper et al. | ............ | 33/366.23 |
| 7,595,479 B2 * | 9/2009 | Luo | ................ | 250/221 |
| 2006/0048400 A1 * | 3/2006 | Huang et al. | ................ | 33/366.23 |

* cited by examiner

*Primary Examiner* — Christopher W Fulton
(74) *Attorney, Agent, or Firm* — Crowell & Moring LLP

(57) ABSTRACT

An inclination detector device is disclosed. The detector device has a light source, a light sensor device, and a level arranged between the light source and the light sensor device. In addition, a light guide is arranged between the light source and the level. The light source is joined to the light guide, the light guide is joined to the level, and the level is joined to the light sensor device in such a way that the light source, the light guide, the level, and the light sensor device form a closed unit.

16 Claims, 3 Drawing Sheets

INCLINATION DETECTOR DEVICE WITH A CLOSED OPTICAL PATH

This application claims the priority of German Patent Document No. 10 2008 041 032.2, filed Aug. 6, 2008, the disclosure of which is expressly incorporated by reference herein.

BACKGROUND AND SUMMARY OF THE INVENTION

The invention relates to an inclination detector device, a precision operating device having an inclinably mounted device, and a method for manufacturing an inclination detector device.

Inclination detector devices are sensors which detect inclination by means of an inclination sensor. Inclination generators may be a level having a hollow body filled with a liquid and a gas bubble. Such inclination detector devices are widely used in precision equipment in construction and in surveying technology.

For example, the use of an inclination detector device with a level and optoelectronic scanning of the position of the gas bubble in a rotary construction laser is known. Light sources and light sensors here are arranged on the level in such a way that the position of the gas bubble can be detected by the light sensors. The level is connected to a device of the working apparatus such that the inclination of the device influences the position of the gas bubble. The light sources and light sensors are held by a carrier independently thereof mechanically. A gap is therefore formed between the light sources and the level and between the level and the light sensors.

Soiling between the light sources and the level and between the level and the light sensors may therefore lead to disturbances in the optical path through which light emitted by the light sources and received by the light sensors passes. This can have a negative influence on the imaging of the gas bubble of the level on the light sensors, such that there are errors in detection of the inclination, which can have a very negative effect on the detection accuracy of the inclination detector device.

To prevent such disturbances in the optical path, high demands are usually made regarding the cleanliness and quality in manufacturing such inclination detector devices, making production more expensive and more difficult.

In addition, complex safety equipment must be provided to prevent soiling and/or it is necessary to perform frequent cleanings.

The object of the present invention is to provide an inclination detector device which has a reduced sensitivity to soiling and surface deviations in the optical components and can be manufactured easily and inexpensively at the same time.

An inclination detector device according to the present invention has a light source, a light sensor device and a level arranged between the light source and the light sensor device. In addition, a light guide is provided between the light source and the level. The light source is connected to the light guide, the light guide is connected to the level and the level is connected to the light sensor device in such a way that the light source, the light guide, the level and the light sensor device form a closed unit.

Instead of a level, another mechanism may also be used by means of which a position or inclination in space can be determined.

Furthermore, the level may have a component with which a position or inclination in space can be determined. For example, it may be formed by a hollow body filled with a liquid and a gas bubble. To detect the inclination in a spatial dimension, it may be used as a tube level with a cylindrical hollow body, for example. In addition, a top side of the hollow body aligned upward spatially may also have a curvature, so that the gas bubble always floats at the highest point in the space due to its buoyancy.

The light source may have one or more light emitting components such as light-emitting diodes (LEDs) for generating light of any wavelength. For example, two or more LEDs as the light source may be arranged along a longitudinal axis of the level to determine the position of the gas bubble.

Photosensors, photodiodes or photo lines may be used as the light sensor device. For example, one or more photo lines with photosensors may be arranged along the longitudinal axis of the level and thus allow optical scanning of the position of the gas bubble. A plurality of light sensitive detectors, for example 60, may be arranged in one line, which may be arranged along the longitudinal axis of the level. The position of the gas bubble can be determined on the basis of the curve of the intensity of the incident light along the line. Electronic scanning of the position of the gas bubble is also possible.

For alignment in two spatial dimensions, two inclination detector devices may be used, such that the longitudinal axes of the levels of the inclination detector devices do not run parallel to one another.

The light guide arranged between the light source and the level may be made of any essentially transparent material, i.e., a material that essentially does not interact with light passing through it. This allows a sharp imaging and/or projection of the level and the gas bubble contained therein onto the light sensor device. The light guide may act here as a spacer and may ensure that the light source can be arranged at an adequate distance from the level. In this way, a suitable incidence of the light, for example, at an angle of incidence of 90°, can allow sharp imaging of the position of the gas bubble.

Due to the connection of the light source to the light guide, the light guide to the level and the level to the light sensor device, it is possible to achieve the effect that these optically active components form a closed unit. To form the closed unit, the components may be joined in a non-positive, force-fit manner or bonded permanently, e.g., by means of adhesive. It is thus possible to ensure that there is no gap between the optically active components, thus forming a closed optical path, which is traveled by the light generated by the light source and received by the light sensor device. Soiling between the optically active components that could influence the imaging of the position of the gas bubble on the sensor device is prevented in this way. This makes it possible to prevent additional refraction of the light in a transfer of the light into or out of the gap occurring with known inclination detector devices (without bonding of the components).

It is thus possible to ensure that the optical path along which the light is guided from the light source into the light sensor device may be embodied so as to yield the fewest possible transitions of the light between materials having different refractive indices. Additional refraction which may occur at the transitions can thus be avoided.

To allow a stable connection of the closed unit, the materials used may be selected so that they have essentially the same thermal expansion coefficient. Then it is possible to achieve the result that the closed unit remains closed even under varying ambient temperatures and operating temperatures and remains protected from soiling and shifting. Likewise, selecting materials having essentially the same thermal expansion coefficient achieves the result that the refraction properties along the optical path are essentially invariably good, regardless of the ambient temperature and/or temperature of use.

In one embodiment, the light source is connected to the light guide, the light guide is connected to the level, and the level is connected to the light sensor device by an optical joining means. An optical adhesive may be used as the optical bonding compound. This may be an essentially transparent UV adhesive, which may have a refractive index similar to that of the light guide and/or that of the materials used in the level.

The optical bonding compound may have essentially the same thermal expansion coefficient as the optically active components of the closed unit to achieve a stable bond at different ambient temperatures and operating temperatures and to prevent stresses due to different expansion. The refraction properties in particular are therefore essentially independent of temperature, as described above.

Due to the optical bonding compound, the closed unit consisting of the light source, the light guide, the level and the light sensor device may be adhesively bonded so that spatial shifting of the optical components relative to one another can be prevented after the adhesive bonding. This prevents a deviation and/or drift in the output signal generated. Furthermore, adhesive bonding makes it possible to permanently prevent any dirt from penetrating.

In addition, any cavities that may be present can be filled with the optical bonding compound. Such cavities may be formed by irregularities in the surfaces of the optical components such as scratches or manufacturing inaccuracies. By filling the cavities with the optical bonding compound, unplanned refraction and reflection of light within the closed unit can be prevented. This allows sharp imaging of the position of the gas bubble on the light sensor device.

By using the optical bonding compound, a closed optical path can therefore be achieved in the closed unit and permanently secured. This is important because with a use of the inclination detector device in precision equipment, the position of the gas bubble must be determined with a precision greater than 10 μm.

In a preferred embodiment, an aperture is provided between the level and the light source. The aperture may allow a defined entrance of the light emitted by the light source into the level. It is thus possible with the help of the aperture to direct beams of light into the level in particular, with light striking the level essentially at a right angle to prevent reflections.

The aperture may be of any design. For example, by using an aperture having multiple slots, essentially parallel beams of light can be directed into the level. It is thus possible to arrange two LEDs as the light source with the same distance from a center position, such that the center position describes the position of the gas bubble with an essentially horizontal alignment of the level. The distance from the center position may be selected, so that the gas bubble comes to lie between the light sources with an essentially horizontal alignment of the inclination detector device. By using an aperture with two slots, it is possible to achieve the result that two essentially parallel beams of light are directed through the level. These may run in such a way that they are not passed through the gas bubble with an essentially horizontal alignment of the level, but with any other inclination of the level they are passed through the gas bubble. This allows a simple determination of the position of the gas bubble.

The aperture may be arranged in any position between the light source and the level. For example, it may be arranged between the light source and the light guide, within the light guide or between the light guide and the level.

In one variant of this embodiment, the light guide has the aperture on a side facing the level. In this embodiment, the light guide serves as a space between the light source and the aperture and may cause the beams of light defined by the aperture to be directed into the level.

In one variant of this embodiment, the spatial extent of the light guide is selected so that the beams of light generated by the light source and passed through the light guide into the level are essentially parallel. In this variant, the spatial extent of the light guide between the light source and the level, which is determined by the thickness of the light guide, ensures a distance between the light source and the level corresponding to the spatial extent. A defined admittance of beams of light into the level can be achieved in this way. The thickness of the light guide is preferably selected so that it corresponds to approximately six times the value of the aperture.

Through almost parallel incident beams of light, the shadow detected with the sensors is imaged sharply and can be evaluated with simple means. However, by means of modified analytical software, it is also possible to compensate for the more complex case of divergent beams of light. The thickness of the light guide can also be reduced in this way in an alternative embodiment, leading to a reduced structural depth of the inclination detector device in this dimension. In an especially preferred embodiment, it is possible to reduce the thickness of the light guide to zero.

In one embodiment, the closed unit is surrounded essentially completely by a casting compound.

Any desired material which allows casting may be used as the casting compound. For example, a casting compound which cures following casting may be selected as the casting compound. For example, plaster, a ceramic compound or a cast resin may be used, and the cast resin may be mixed with mineral additives. In addition, casting by foaming, e.g., with plastic foam, is also possible.

The casting compound may essentially have the same thermal expansion coefficient as the components contained in the casting to achieve a stable bond under varying operating temperatures and ambient temperatures and to prevent the stresses that occur and can lead to cracks and thus instability and soiling.

Before casting, the inclination detector device may be arranged on and/or attached to a device whose inclination is to be determined and/or regulated by the inclination detector device. This device and/or unit may contain, for example, the laser collimator, servo motors and/or other components. By attaching the inclination detector device to the device before casting, it is possible to achieve the result that the inclination detector device is attached to the device with a predetermined alignment. A subsequent alignment of the device can be detected and/or an adjustment of the alignment can be supported in this way.

Likewise, additional sensors, which are in direct contact with the inclination detector device or are also mounted on a device, may also be integrally cast with it and thereby bonded together. The device may contain the laser collimator or other components of a precision operating device. The other sensors preferably include temperature sensors, acceleration meters and inclination meters for another angle range or a second inclination detector device for redundancy. However, alternatives to this are also readily possible.

In casting, the device itself or parts thereof may also be cast as well, so they may also be enclosed partially or completely by the casting compound. This allows a stable bond between the device and the inclination detector device. It is possible to achieve the result that an alignment of the device can be detected and/or regulated by means of the inclination detector device.

The optical components of the closed unit may additionally be joined and bonded by the casting. They may also be held together only by the casting compound, so that in this case bonding by means of an adhesive may be omitted. When using adhesive tape and casting compound, the closed unit may additionally be mechanically stabilized. This produces an additional fixation of the optical components relative to one another and increases the vibration strength and shock resistance of the unit. Thus, relative movements of the components in relation to one another can be further prevented, so that "drift" of the output signal of the inclination detector device can be essentially prevented.

Furthermore, in casting, the components are enclosed, which may thus provide additional protection against penetration of moisture, dust, foreign bodies, water, etc.

Through casting with a suitably selected casting compound, electric insulation of the inclination detector device can also be achieved or improved and dielectric strength can thereby be increased. This may be the case if the electronic components are enclosed by the casting compound and the casting compound has suitable insulating or water-repellant properties.

In addition, casting of the inclination detector device allows designing of the surface of the inclination detector device. For example, the inclination detector device may be designed through the casting so that coupling to a mounting device for installation of the inclination detector device is enabled, facilitated and/or stabilized. Thus, in a suitable embodiment of the surface, it is possible to omit separate receptacles for individual components of the inclination detector device. In addition, by stabilizing of the coupling with the retaining device, drift of the output signal of the inclination detector device with respect to the retaining device is reduced.

In one variant of this embodiment, the casting compound is essentially opaque. In this variant, outside light present outside of the casting compound essentially cannot enter the optical fiber, the level or the light sensor device. A closed optical path protected from outside light can be achieved in this way. Interference in the imaging of the gas bubble on the light sensor device due to foreign light can thus essentially be prevented.

In one embodiment, an installation device is provided for installation of the light source and the light sensor device. The use of a common installation device of these electronic components allows simple contacting of the light source and the light sensor device. Power can be supplied at the contacts provided on the installation device, for example, and the output signal of the inclination detector device supplied by the light sensor device can be picked up there as well.

The installation device may also be designed as a carrier for installation of the light source and the light sensor device. An additional mechanical stabilization of the closed unit may thus be achieved.

A flex print, which can supply a flexible plastic carrier with electric conductors for multiple electric connections, may be used as the installation device. The light source and the light sensor device can be soldered easily in the flex print. With the help of the flex print, the electronic contacts can easily be guided out of the closed unit enclosed by the casting compound, which allows electric contacting of the electronic components of the inclination detector device.

According to another embodiment of the invention, a precision operating device has an apparatus which can be mounted so that it is inclinable. An inclination of the device can be determined and/or regulated on the basis of an inclination detector device as described previously. Thus the inclination detector device can detect and signal the inclination of the device, thus allowing an adjustment of the inclination of the device, e.g., a horizontal alignment. In addition, the inclination of the device can be regulated automatically by detection of the inclination by the inclination detector device.

In one embodiment, the precision operating device is a rotary construction laser and the apparatus is a rotatably mounted deflecting device for deflecting a laser light which can be generated by a laser light source arranged separately from the deflecting device or connected to the deflecting device. In this embodiment, the inclination detector device allows an adjustment of a predetermined inclination of the deflecting device, so that the laser markings can be generated with the predefined inclination on the surfaces of objects that directly surround the rotary construction laser.

In one variant of this embodiment, a laser collimator is provided. With the help of the laser collimator, laser light can be generated and/or emitted with a defined beam course, e.g., parallel.

The laser collimator, together with other components, may be arranged as part of a device mounted so that it can be inclined by means of a bearing mechanism in the rotary construction laser. The device, which is mounted so it can be inclined, may have one or more servo motors. Through the servo motors, a force can be generated against a plate attached to a housing of the rotary construction laser. Through the action of this force, the inclination of the inclinably mounted device and thus of the laser collimator with respect to the plate can be altered. An alignment of the beam path of the laser light generated by the laser collimator can be achieved in this way.

For example, two inclination detector devices with different alignments of the longitudinal axes of the respective levels may be arranged on the laser collimator. The inclination detector devices may be attached to the laser collimator in such a way that the longitudinal axes are aligned essentially perpendicular to the beam path of the laser light emitted by the laser collimator.

The laser collimator together with the inclination detector device may be embedded entirely or partially in the casting compound. For example, the bottom and/or the top of the laser collimator may protrude out of the casting compound.

Joint casting of the laser collimator with one or more inclination detector devices allows a stable coupling of the laser collimator to the inclination detector devices and thus allows detection, regulation and/or adjustment of the alignment of the beam path of the laser light based on an output signal of the inclination detector device.

The alignment and/or inclination of the laser collimator can be adjusted with the help of inclination detector devices arranged on the laser collimator and/or integrally cast with the laser collimator. As a rule, before the adjustment there is an approximate setting, e.g., by an operating person. This may be performed by hand, for example, with the help of additional levels that are mounted on the rotary construction laser and are visible from the outside. Then the operating person may initiate an automatic adjustment in which the device which is mounted to be inclinable is precision adjusted together with the laser collimator, e.g., by means of the servo motors and the bearing mechanism. The automatic adjustment may be performed on the basis of the output signal of the inclination detector devices arranged with the laser collimator.

By means of the casting, drift of the alignment of the laser light generated with respect to a signal of the sensor can be largely prevented.

Thus, in the long term, a stable alignment of the laser light projected by the rotary construction laser can be achieved, based on a signal of the inclination detector device, e.g., over the lifetime of the rotary construction laser. The embedding thus increases the robustness of the rotary construction laser over its lifetime.

A method for manufacturing an inclination detector device having a light source, a light guide, a level and a light sensor device comprises bonding of the light source to the light guide and bonding of the light guide to the level and bonding of the level to the light sensor device by an optical bonding compound. This method thus allows the light source, light guide, level and light sensor device to form a closed unit.

The bonding of the closed unit may be performed during production with high cleanliness requirements, e.g., under clean room conditions. It is thus possible to ensure that soiling in the closed unit is eliminated. In addition, a spatial fixation of the components of the closed unit relative to one another is thus also achieved.

After bonding of the closed unit, it is essentially protected from soiling by the optical bonding compound. It is therefore possible in the remaining course to reduce cleanliness demands. Furthermore, precautionary measures for preventing spatial displacement of the components of the closed unit among one another may be suppressed because the spatial fixation retards or entirely prevents such shifting. This allows an inexpensive design of the remaining process.

One embodiment of the production process also comprises casting of the light source, the light guide, the level and the light sensor device with a casting compound. By means of this casting, the cast components may be additionally secured with respect to one another and with an increased strength and sealed off from the environment. In the remaining course of the process, it may be assumed that the cast components are fixedly bonded together and form an optically closed path. Therefore, no additional precautionary measures which should prevent soiling or displacement of the optical components relative to one another are necessary and the production process can be embodied inexpensively.

In another embodiment of the method for production of an inclination detector device, the closed unit may be attached to a laser collimator, with an alignment of the longitudinal axis of the level perpendicular to the alignment of a beam that can be created by, arranged on and adhesively bonded to the laser collimator, for example.

In one variant of this embodiment, the laser collimator may be cast with a casting compound with the closed unit attached to it. A stable coupling of the laser collimator to the inclination detector devices arranged thereon can thus be achieved.

These and additional features of the present invention are explained in greater detail below on the basis of examples and with the assistance of the accompanying figures.

DETAILED DESCRIPTION OF THE DRAWINGS

Figure 1:
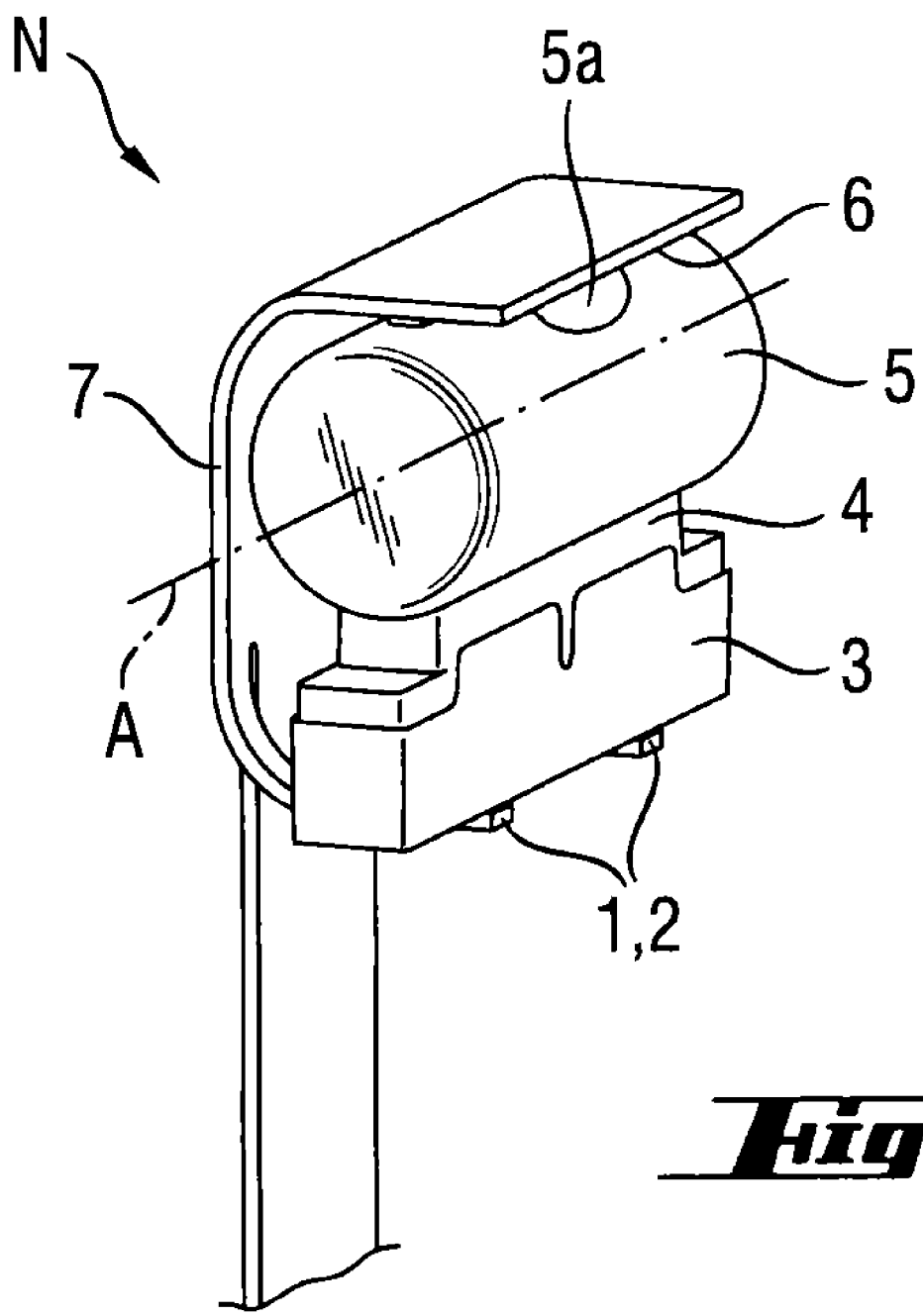
FIG. 1 shows schematically an exemplary embodiment of an inclination detector device.

An inclination detector device N is shown in FIG. 1, its light source being formed by two LEDs 1, 2.

The light generated by the LEDs 1, 2 is directed into a spacer 3 comprising a light guide. Beams of light of the LEDs 1, 2 having a defined, for example, essentially parallel course and a defined, for example, essentially perpendicular angle of incidence are directed into a level 5 through an aperture 4.

The level 5 is filled with a liquid and has a gas bubble 5a, which is positioned differently, depending on the inclination of the level with respect to the longitudinal axis A.

Through the beams of light passed through the level 5, an image of the interior of the level 5, and in particular the position of the gas bubble 5a, is generated on the linear sensors 6 which are arranged on a side of the level opposite the LEDs 1,2.

Power supply to the LEDs 1, 2 and the linear sensors 6 is provided via a flex print 7, which may also conduct an output signal generated by the linear sensors 6 to an analyzer device, for example.

The inclination detector device N may be surrounded essentially completely by a casting compound (not shown). Only contacts provided on the flex print 7 may remain accessible and allow electric contacting of the electronic components.

The inclination detector device shown in FIG. 1 makes it possible to detect the position of the gas bubble 5a in the level 5 with a closed optical path between the LEDs 1, 2 and the linear sensors 6. Interference, for example, due to soiling of surfaces of the components or shifting of the components relative to one another, is prevented by the closed optical path.

Figure 2:
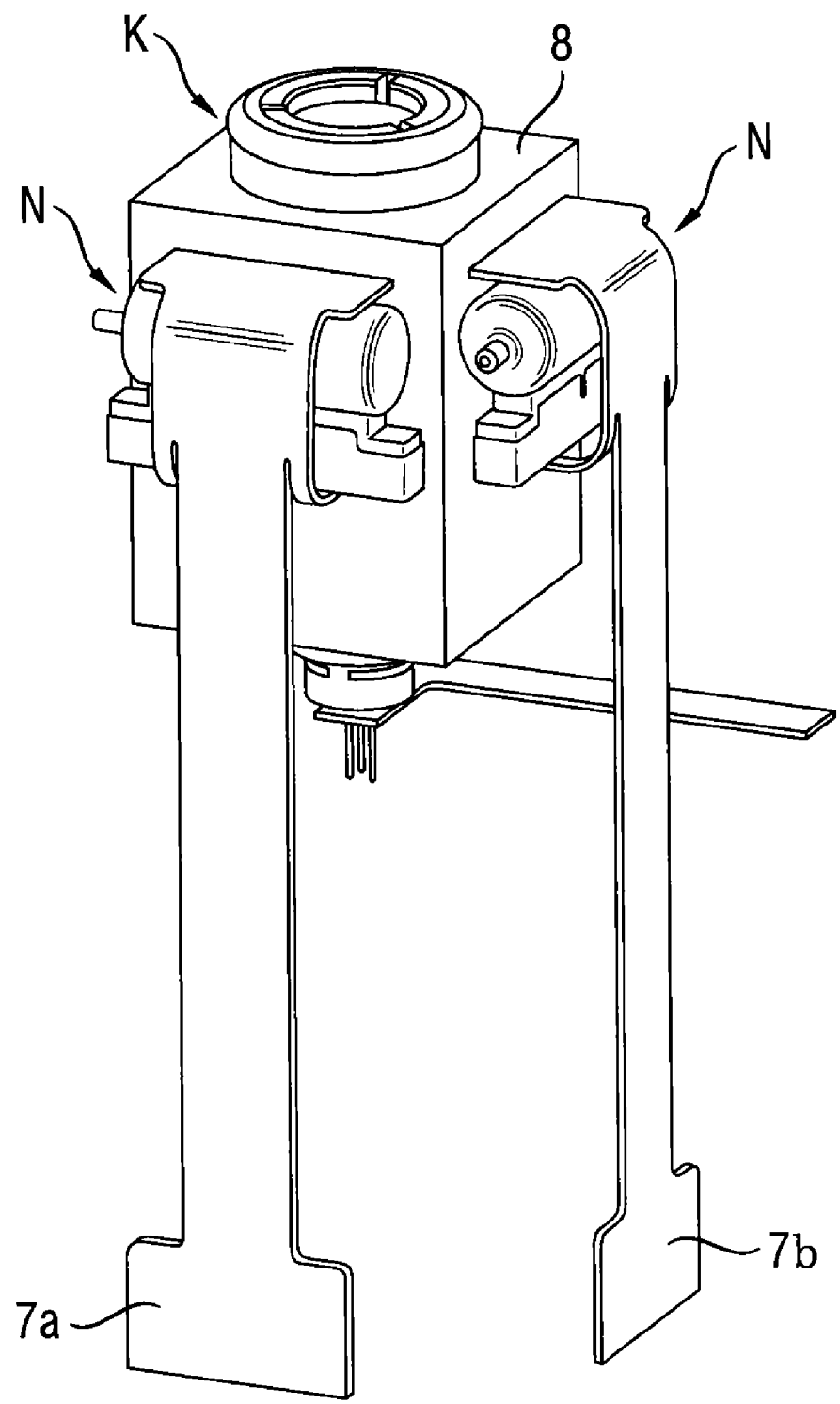
FIG. 2 shows schematically a device for generating laser light with two exemplary embodiments of inclination detector devices.

FIG. 2 shows schematically an arrangement of two inclination detector devices N on a laser collimator K for generator and/or collecting laser light. The inclination detector devices N are arranged on a housing 8 of the laser collimator K. Due to the contact straps 7a and 7b of the flex prints 7 of the inclination detector devices N, the inclination angles determined by the inclination detector devices N can be picked up.

Figure 3:
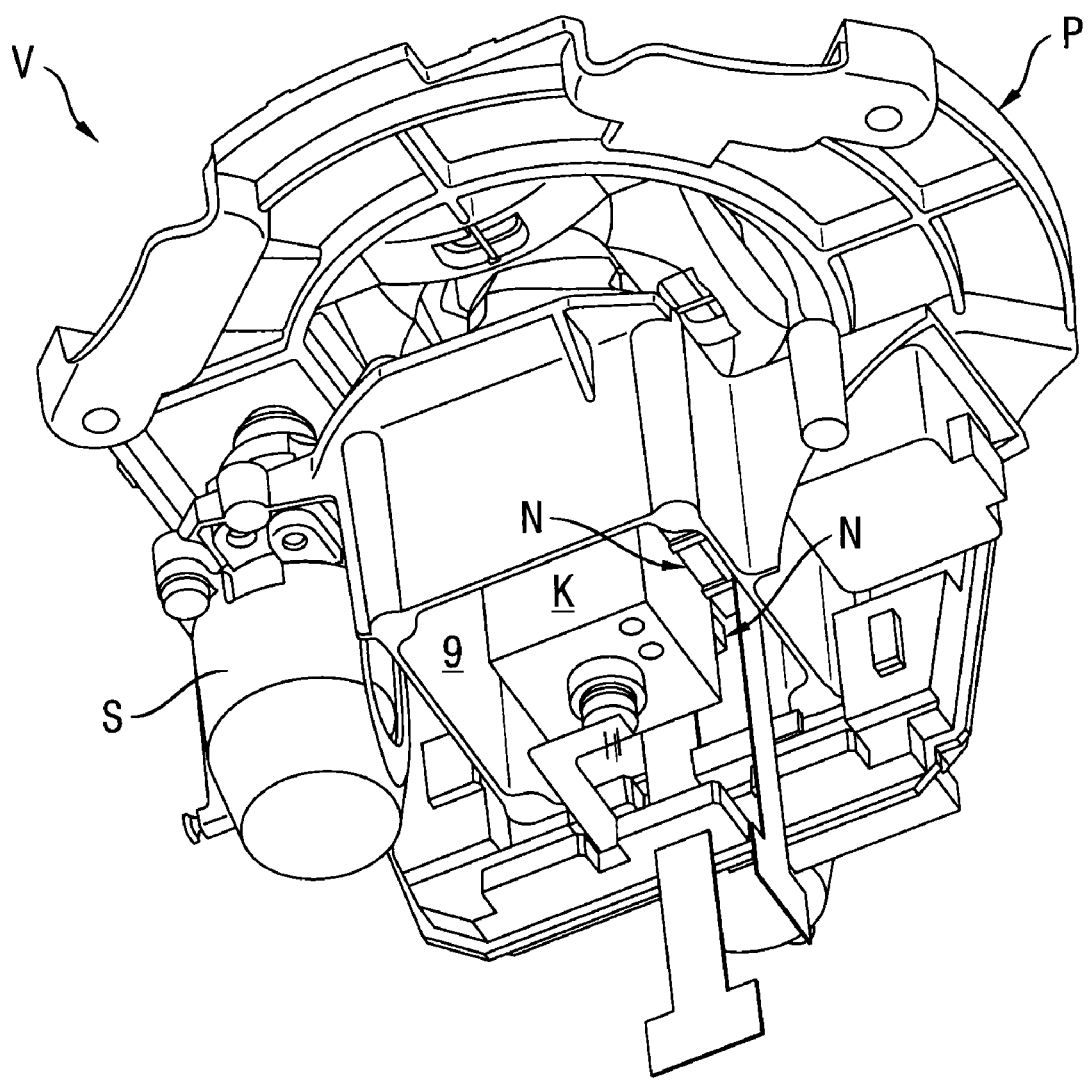
FIG. 3 shows schematically a variant of the installation of a device for generating and/or collecting laser light in a rotary construction laser.

FIG. 3 illustrates schematically the installation of the arrangement shown in FIG. 2 in an inclinably mounted device V of a rotary construction laser (not shown). The device V is mounted in a bearing device so it can be inclined with respect to a plate P mounted on a housing of the rotary construction laser. The device V may be displaced and/or inclined toward the plate P with the help of a servo motor S.

A cavity 9 in which the laser collimator K may be arranged with the inclination detector devices N arranged at the side is provided in the device V. The laser collimator K with the inclination detector devices N arranged laterally on it may be cast in the cavity 9 with a casting compound (not shown) such as plaster. A stable bonding of the laser collimator K to the inclination detectors N in the inclinably mounted device V of the rotary construction laser can be achieved in this way. The bonding allows adjustment of the inclination of the device V with respect to the plate P on the basis of an output signal of the inclination detectors N. At the same time, this achieves a robust installation of the inclination detector devices N with the laser collimator K in the inclinably mounted device V of the rotary construction laser that is resistant to soiling and is insensitive to mechanical shocks.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An inclination detector device, comprising:
a light source;
a light sensor device;
a level which is arranged between the light source and the light sensor device; and
a light guide which is arranged between the light source and the level;
wherein the light source is connected to the light guide, the light guide is connected to the level, and the level is connected to the light sensor device such that the light source, the light guide, the level, and the light sensor device form a closed optical path without any gap between the light source and the light guide, between the light guide and the level, and between the level and the light sensor device.

2. The inclination detector device according to claim 1, wherein the light source is connected to the light guide and the light guide is connected to the level and the level is connected to the light sensor device by an optical bonding compound.

3. The inclination detector device according to claim 1, wherein an aperture is provided between the level and the light source.

4. The inclination detector device according to claim 1, wherein the light guide has an aperture on a side facing the level.

5. The inclination detector device according to claim 1, wherein the light guide has a spatial extent such that beams of light generated by the light source and passed through the light guide into the level are essentially parallel.

6. The inclination detector device according to claim 1, wherein the closed optical path is surrounded essentially completely by a casting compound.

7. The inclination detector device according to claim 6, wherein the casting compound is essentially opaque.

8. The inclination detector device according to claim 1, wherein the light source and the light sensor device are provided on an installation device.

9. A precision operating device, comprising:
an inclinably mounted device; and
an inclination detector device, wherein the inclination detector device includes:
a light source;
a light sensor device;
a level which is arranged between the light source and the light sensor device; and
a light guide which is arranged between the light source and the level;
wherein the light source is connected to the light guide, the light guide is connected to the level, and the level is connected to the light sensor device such that the light source, the light guide, the level, and the light sensor device form a closed optical path without any gap between the light source and the light guide, between the light guide and the level, and between the level and the light sensor device;
and wherein an inclination of the inclinably mounted device is detectable detected by the inclination detector device.

10. The precision operating device according to claim 9, wherein the precision operating device is a rotary construction laser and the inclinably mounted device is a rotatably mounted illumination device for emitting laser light.

11. The precision operating device according to claim 10, wherein a laser collimator is embedded in a casting compound in a cavity defined by the inclinably mounted device.

12. A method for manufacturing an inclination detector device, the inclination detector device having a light source, a light guide, a level, and a light sensor device, comprising the steps of:
joining the light source to the light guide and the light guide to the level and joining the level to the light sensor device by an optical bonding compound.

13. The method for manufacturing an inclination detector device according to claim 12, further comprising the step of:
casting the light source, the light guide, the level, and the light sensor device with a casting compound.

14. The method for manufacturing an inclination detector device according to claim 12:
wherein the light source, the light guide, the level, and the light sensor device are joined together by the optical bonding compound to form a closed unit;
and further comprising the step of:
attaching the closed unit to a laser collimator.

15. The method for manufacturing an inclination detector device according to claim 14, further comprising the step of:
casting the laser collimator and the closed unit with a casting compound.

16. A method for manufacturing an inclination detector device, the inclination detector device having a light source, a light guide, a level, and a light sensor device, comprising the steps of:
connecting the light source to the light guide and the light guide to the level and connecting the level to the light sensor device to form a closed optical path without any gap between the light source and the light guide, between the light guide and the level, and between the level and the light sensor device.

* * * * *